Feb. 16, 1932. H. S. GOLDEN 1,845,409
RADIATOR CAP
Filed April 9, 1928

Inventor
Harry S. Golden
By Blackmore, Spencer & Flint
Attorneys

Patented Feb. 16, 1932

1,845,409

UNITED STATES PATENT OFFICE

HARRY S. GOLDEN, OF FLINT, MICHIGAN, ASSIGNOR TO GENERAL MOTORS CORPORATION, OF DETROIT, MICHIGAN, A CORPORATION OF DELAWARE

RADIATOR CAP

Application filed April 9, 1928. Serial No. 268,766.

In order to improve the appearance of the front end of an automobile, I have found that it is desirable to conceal the filler tube of the radiator by surrounding it with a wall or flange, of elliptical or similar shape in plan, secured to the radiator shell. There arises in connection with the structure described above the problem of designing a radiator cap which will close the opening in the upper end of the filler tube in such a manner as to prevent the discharge of water from the radiator therethrough, which will close the space between the walls of the flange, which may be simply and securely fastened to the radiator so as to prevent it being accidentally removed therefrom, and which is of such design that its exposed parts will conform with and merge smoothly into the design of the radiator. It is an object of the invention to provide a radiator cap which will satisfy the requirements outlined above.

Other objects of the invention will be apparent from a perusal of the following specification taken in connection with the accompanying drawings in which.

Figures 1, 2, 3, 4, 5:
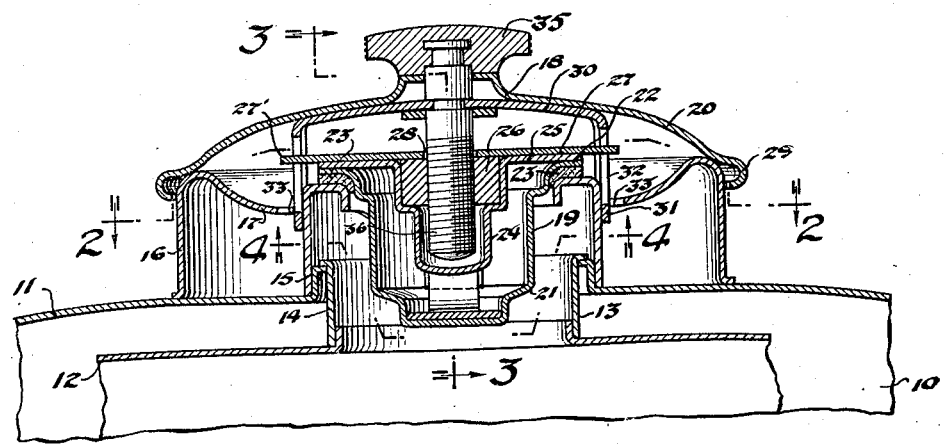
Figure 1 is a fragmentary transverse cross section through the radiator of an automobile showing my cap in position thereon.
Figure 2 is a section taken on the line 2—2 of Figure 1.
Figure 3 is a section taken on the line 3—3 of Figure 1.
Figure 4 is a section taken on the line 4—4 of Figure 1.
Figure 5 is a fragmentary view similar to Figure 1 but showing the cover plate of the cap in elevated position.

Referring to the drawings, the reference character 10 indicates the radiator of an automobile which includes, as usual, an outer shell 11, and an upper tank 12 positioned within the shell. In the upper side of the shell, there is provided an opening through which the lower portion 13 of the radiator filler tube 14, which is provided with an upper portion 15 above the shell, extends. Surrounding the upper portion of the filler tube and secured at its lower edge to the shell 11 is a flange 16 which is of elliptical or similar shape in cross section. Extending inwardly and downwardly from the upper edge of the flange 16, and preferably integral therewith, to adjacent the upper portion of the filler tube and closing the space between this part and the flange 16 is a flange 17.

The reference character 18 indicates generally the radiator cap which includes a filler tube engaging closure element 19 and an elliptical cover-plate 20.

The element 19 includes a cup-shaped member 21 adapted to extend into and be removably connected to the filler tube by any suitable means, such, for example, as the type of bayonet-slot connection shown in the drawings, which being well known will require no further description. On its upper edge, the member 21 is provided with a circumferential flange 22 adapted to seat on the upper edge of the filler tube through the intermediary of a suitable washer 23 which is adapted to be clamped tightly between the two parts when the cap is secured to the radiator to prevent water splashing out of the radiator. A second cup-shaped member 24, of smaller diameter than the member 21, extends down into the interior of the member 21 and is provided on its upper edge with a circumferential flange 25 seated on and suitably secured to the flange 22. Seated within the cup-shaped member 24 and fixed therein so as to prevent relative rotation of the two parts is a nut 26. Seated on the upper surface of the flange 25 and suitably secured thereto is a plate 27 which, in conjunction with the member 24, prevents vertical movement of the nut 26, and which is provided at two of its opposite ends with prongs 27' extending outwardly beyond the outer wall of the filler tube. The plate 27 is provided between its ends with an opening 28 which registers with and is slightly larger in diameter than the threaded bore in the nut 26, for a purpose hereinafter mentioned.

The cover-plate 20 is, as has been stated, of the same shape in plan as the flange and is provided on its outer edges with a downwardly extending flange or bead 29 which fits closely around the outer side of the upper edge of the flange 16. In order to connect the cover-plate and the portion of the cap which closes the filler tube so as to prevent relative rotation of these parts and still allow relative vertical movement thereof, there is provided a plate 30 which is secured to the inner surface of the cover-plate and which is provided on its opposite ends with downwardly projecting prongs or guides 31 having intermediate their ends vertical slots 32 in which are positioned the prongs 27'. These prongs or guides 31 are, furthermore, adapted to enter into slots 33 provided in the flange 17 to insure that the cover-plate will be positioned properly with the respect to the flange 16 when the cap is in closed position. A stud 34 which extends through the cover-plate and the plate 30 carries on its upper end on the outside of the cover-plate, a knurled nut or knob 35 which is journaled intermediate its ends in the plate 30 in such a manner as to prevent longitudinal movement of the stud with respect to the cover-plate. The lower end of the stud 34 is threaded, as indicated at 36, and passes through the opening 28 into threaded engagement with the nut 26.

Before the cap can be removed vertically from the radiator, it must be given a partial rotation to break the connection between the filler tube and the portion of the cap which closes the filler tube. However, due to the shape of the cover-plate and the flange 16, before this can be done the cover-plate must be raised vertically to a position in which the lower edges of the flange or bead 28 are above the upper edge of the flange 16. Therefore, to remove the cap from the radiator, it is first necessary to turn the knob 35 in the direction to cause upward movement of the stud 34 and consequent upward movement of the cover-plate. When the lower edges of the cover-plate are raised to a position in which they are above the upper edge of the flange 16, the whole cap is rotated by grasping the cover-plate and turning it in the proper direction to free the prongs of the bayonet-slot connection from their contact with the portion of the bayonet-slot connection carried by the filler tube. After the cap is moved to this position, it is only necessary to lift it vertically to remove it entirely from the radiator. The operation of replacing the cap, it is thought, will be obvious.

Though I have shown and described a specific embodiment of my invention, it is to be understood that this has not been done with the object of limiting my invention thereto, but merely by way of example, and that the scope of my invention is defined only by the appended claims.

I claim:

1. In a radiator, a filler tube, a shell, a flange on the shell surrounding the filler tube, a cap, including means to close the filler tube, and means, movable relative to the first-mentioned means to close the space between the walls of the flange.

2. In a radiator, a filler tube, a shell, a flange on the shell surrounding the filler tube, a cover-plate adapted to be seated on the flange and which when seated on the flange is non-rotatable with respect thereto, means for closing the filler tube, which means is adapted to be removably secured to the filler tube by means requiring a partial rotation of the first means for release or attachment thereof to the filler tube, means connecting said cover-plate and said first means whereby rotation of the cover-plate will cause rotation of the first means, and means engaging said cover-plate and said first means whereby said cover-plate may be moved from a position in which it is seated on the flange to a position in which it may be rotated with respect thereto.

3. In combination, a cylindrical member, a wall surrounding the member, means to close the space surrounded by the wall, and means, axially movable but non-rotatable with respect to the first-mentioned means, to close the cylindrical member and secure both of said means to the cylindrical member.

4. In a device of the class described, a cylindrical element, a wall surrounding said cylindrical element, a closure for said cylindrical element, a bayonet-slot connection between the closure and the cylindrical element, a closure adapted to be seated on the wall, and screw threaded means connecting said closures.

5. In a device of the class described, a cylindrical element, a non-circular wall surrounding said cylindrical element, a closure for the cylindrical element which is adapted to be connected to the cylindrical element by means requiring a partial rotation of the closure for release or attachment thereof to the cylindrical element, a closure adapted to be seated on the wall and which, when seated on the wall, is non-rotatable with respect thereto, screw threaded means connecting said closures, means through which said last-mentioned means may be rotated to move one of the closures axially with respect to the other, and means to limit relative rotation of the closures.

6. A closure for a receptacle neck extending through a surrounding member, comprising an inner member provided with locking means adapted for releasable assembly with said neck by rotation relative thereto, an outer member, and means connecting said inner and outer members whereby said inner member may be rotated by said outer member, said connecting means permitting axial movement of said outer member relative to said inner member whereby said outer member may be moved into and out of engagement with said surrounding member.

7. In a device of the class described, an annular wall, a second annular wall surrounding and spaced from the first annular wall, and a cover including means to close the end of the first annular wall and means movable relatively to the first mentioned means to close the space between the two annular walls.

In testimony whereof I affix my signature.

HARRY S. GOLDEN.